(12) United States Patent
Lefevre et al.

(10) Patent No.: US 10,795,692 B2
(45) Date of Patent: Oct. 6, 2020

(54) AUTOMATIC SETTINGS NEGOTIATION

(71) Applicant: InterDigital Madison Patent Holdings, SAS, Paris (FR)

(72) Inventors: Chad Andrew Lefevre, Indianapolis, IN (US); Thomas Edward Horlander, Indianapolis, IN (US); Mark Francis Rumreich, Indianapolis, IN (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/574,445

(22) PCT Filed: Jun. 20, 2016

(86) PCT No.: PCT/US2016/043058
§ 371 (c)(1),
(2) Date: Nov. 15, 2017

(87) PCT Pub. No.: WO2017/015324
PCT Pub. Date: Jan. 26, 2017

(65) Prior Publication Data
US 2018/0136950 A1    May 17, 2018

Related U.S. Application Data

(60) Provisional application No. 62/195,866, filed on Jul. 23, 2015.

(51) Int. Cl.
*G06F 9/44*    (2018.01)
*G06F 9/445*    (2018.01)
(Continued)

(52) U.S. Cl.
CPC ........... *G06F 9/4451* (2013.01); *G05B 15/02* (2013.01); *G06K 9/00362* (2013.01);
(Continued)

(58) Field of Classification Search
CPC ......... H04N 21/4884; H04N 21/42202; H04N 21/44218; H04N 21/4661; H04N 21/4852;
(Continued)

(56) References Cited

U.S. PATENT DOCUMENTS 6,530,083 B1 * 3/2003 Liebenow .............. H04N 7/163
348/E7.061
2007/0271580 A1    11/2007 Tischer et al.
(Continued)

FOREIGN PATENT DOCUMENTS

CN    101030885 A    9/2007
CN    103369391 A    10/2013
(Continued)

OTHER PUBLICATIONS

International Search Report for PCT/US2016/039556 dated Sep. 12, 2016.
(Continued)

*Primary Examiner* — Zahid Choudhury
(74) *Attorney, Agent, or Firm* — Invention Mine LLC

(57) ABSTRACT

A method and apparatus for a first device to determine profile information are described including receiving input from a second device, wherein at least one of the first device or the second device detects physical characteristics of people present in an area and the physical characteristics are used by the device to determine who is present in the area, retrieving profile information of the people present in the area, determining a relationship between profiles of the people in the area, applying rules to negotiate a compromise regarding device settings responsive to the relationship between profiles of the people present in the area and adjusting settings of a first device or a third device responsive to the compromise.

27 Claims, 3 Drawing Sheets

(51) Int. Cl.
| | |
|---|---|
| *H04N 21/485* | (2011.01) |
| *H04H 60/45* | (2008.01) |
| *H04H 60/33* | (2008.01) |
| *H04H 60/46* | (2008.01) |
| *H04N 21/442* | (2011.01) |
| *H04H 60/80* | (2008.01) |
| *H04N 21/466* | (2011.01) |
| *H04H 60/40* | (2008.01) |
| *H04H 60/32* | (2008.01) |
| *H04N 21/422* | (2011.01) |
| *G05B 15/02* | (2006.01) |
| *G06K 9/00* | (2006.01) |
| *H04N 21/488* | (2011.01) |
| *H04N 21/41* | (2011.01) |

(52) U.S. Cl.
CPC ............ *H04H 60/32* (2013.01); *H04H 60/33* (2013.01); *H04H 60/40* (2013.01); *H04H 60/45* (2013.01); *H04H 60/46* (2013.01); *H04H 60/80* (2013.01); *H04N 21/42202* (2013.01); *H04N 21/44218* (2013.01); *H04N 21/4661* (2013.01); *H04N 21/4852* (2013.01); *H04N 21/4856* (2013.01); *H04N 21/4884* (2013.01); *H04N 21/4131* (2013.01)

(58) Field of Classification Search
CPC .. H04N 21/4131; G05B 15/02; G06F 9/4451; G06K 9/00362; H04H 60/32; H04H 60/33; H04H 60/40; H04H 60/45; H04H 60/46; H04H 60/80
See application file for complete search history.

(56) References Cited

U.S. PATENT DOCUMENTS

| | | |
|---|---|---|
| 2008/0046930 A1 | 2/2008 | Smith |
| 2008/0130958 A1 | 6/2008 | Ziomek |
| 2009/0146779 A1 | 6/2009 | Kumar et al. |
| 2009/0174658 A1* | 7/2009 | Blatchley ............... G06F 1/1601 345/158 |
| 2009/0195524 A1* | 8/2009 | Shen ......................... G09G 5/00 345/207 |
| 2013/0061258 A1* | 3/2013 | Takaya .................... H04H 60/45 725/10 |
| 2014/0181910 A1* | 6/2014 | Fingal ..................... H04L 63/105 726/4 |
| 2014/0245335 A1 | 8/2014 | Holden et al. |
| 2014/0282646 A1 | 9/2014 | Mccoy et al. |
| 2015/0092107 A1* | 4/2015 | Shao ................. H04N 21/41407 348/561 |
| 2015/0163257 A1 | 6/2015 | Bank |
| 2015/0177827 A1* | 6/2015 | Lin ............................ G06F 3/01 345/156 |
| 2015/0264299 A1* | 9/2015 | Leech ................... H04N 19/137 348/78 |
| 2016/0007173 A1* | 1/2016 | Dowlatkhah ............ G06Q 50/01 455/414.1 |
| 2016/0072970 A1* | 3/2016 | Kimoto .............. H04N 1/00408 358/1.13 |
| 2016/0088352 A1* | 3/2016 | Agarwal ............. H04N 21/4667 725/12 |
| 2016/0098040 A1* | 4/2016 | Garg ....................... G05B 15/02 700/94 |
| 2018/0114509 A1* | 4/2018 | Mese ........................ G09G 5/26 |

FOREIGN PATENT DOCUMENTS

| | | |
|---|---|---|
| CN | 104702881 A | 6/2015 |
| EP | 1329105 A2 | 7/2003 |
| EP | 2614472 A1 | 7/2013 |
| EP | 2624574 | 8/2013 |
| JP | 4852449 B2 | 9/2008 |
| JP | 2008225823 A | 9/2008 |
| JP | 2008271358 A | 11/2008 |
| WO | 2004004341 A1 | 1/2004 |
| WO | WO2009067670 | 5/2009 |
| WO | 2012033921 A1 | 3/2012 |

OTHER PUBLICATIONS

International Search Report for PCT/US2016/043058 dated Oct. 14, 2016.

International Search Report for PCT/US2016/043056 dated Sep. 14, 2016.

International Preliminary Report on Patentability for PCT/US2016/043058 dated Jan. 28, 2018, 8 pages.

* cited by examiner

AUTOMATIC SETTINGS NEGOTIATION

This application claims the benefit, under 35 U.S.C. § 365 of International Application PCT/US2016/043058, filed 20 Jul. 2016, which was published in accordance with PCT Article 21(2) on 26 Jan. 2017 in English and which claims the benefit of U.S. provisional patent application No. 62/195,866, filed 23 Jul. 2015.

FIELD

The proposed method and apparatus relates to automatically adjusting the settings of a home appliance based on external stimuli.

BACKGROUND

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

People have different preferences when it comes to the settings on their devices. Those preferences may change depending upon things such as time of day/ambient lighting. Multiple people in a room may have drastically different preferences.

Some vehicles will change the seat position and mirrors automatically when different keys are used or when a button is pressed to indicate a specific driver. This may require interaction with the driver (button press). This also is not applicable to multiple simultaneous users.

SUMMARY

The proposed method and apparatus includes a method for having the device automatically change the settings depending on the user and to automatically negotiate settings between two or more users. The proposed method and apparatus will also modify the device settings depending upon other external stimuli if configured to do so by the owner of the device. That is, the proposed method and apparatus will automatically adjust the settings of a home appliance, such as but not limited to a TV, STB, A/V receiver, etc. based on external stimuli, such as but not limited to ambient lighting, time of day, who is present in the room, etc.

A method and apparatus for negotiating and adjusting device settings are described including determining who is present in an area, negotiating settings responsive to the determination and adjusting the device settings using the negotiated settings. Also described are a method and apparatus for adjusting device settings on a first device including receiving input from a second device and adjusting the device settings or settings of a third device responsive to the input. Also described are a method and apparatus for a first device to determine profile information including receiving input from a second device, wherein at least one of the first device or the second device detects physical characteristics of people present in an area and the physical characteristics are used by the device to determine who is present in the area, retrieving profile information of the people present in the area, determining a relationship between profiles of the people in the area, applying rules to negotiate a compromise regarding device settings responsive to the relationship between profiles of the people present in the area and adjusting settings of a first device or a third device responsive to the compromise.

BRIEF DESCRIPTION OF THE DRAWINGS

The proposed method and apparatus is best understood from the following detailed description when read in conjunction with the accompanying drawings. The drawings include the following figures briefly described below.

Figure 1:
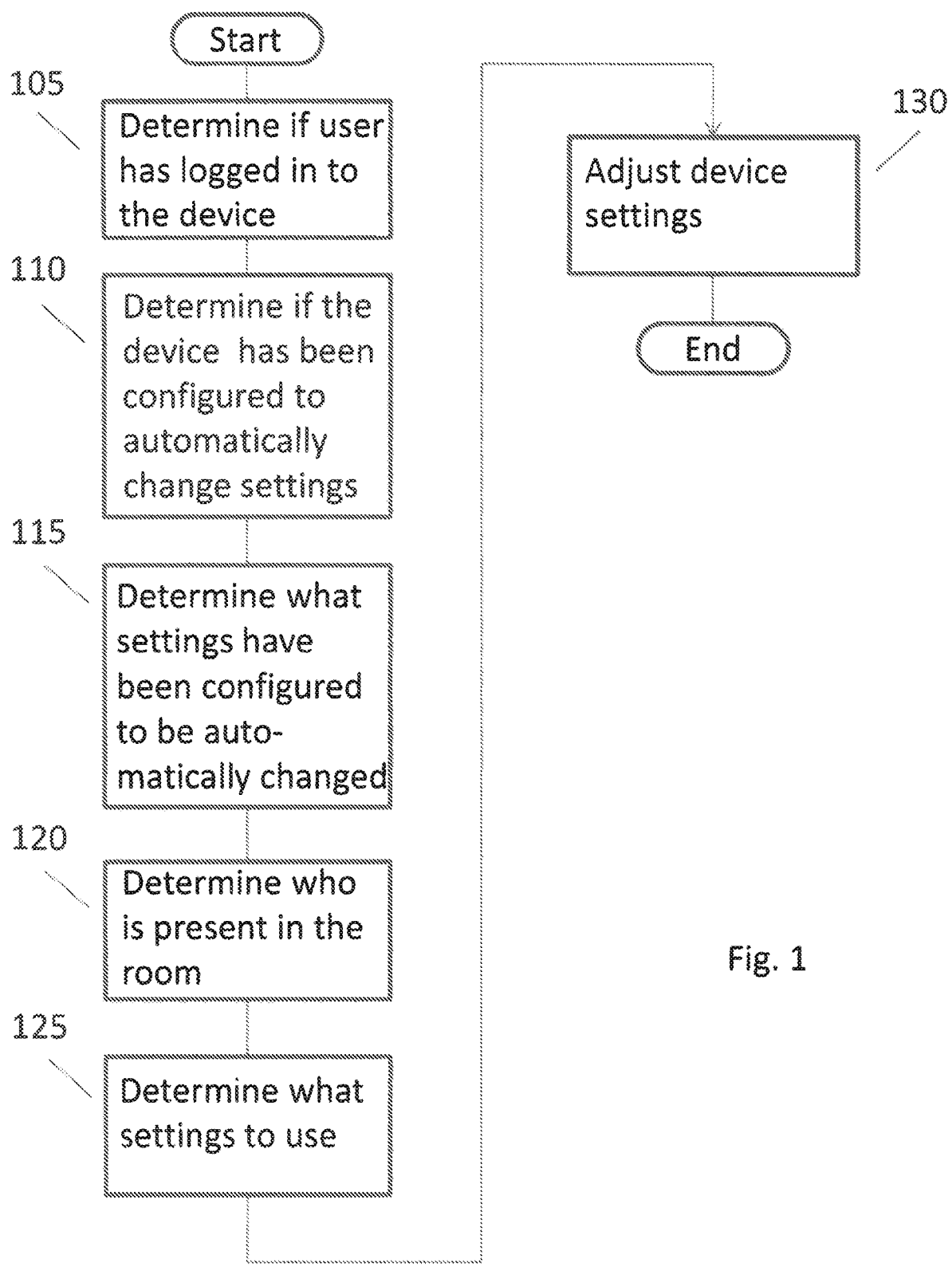
FIG. 1 is a flowchart of an exemplary automatic settings negotiation scheme of a device in accordance with the principles of the proposed method and apparatus.

It should be understood that the drawing(s) are for purposes of illustrating the concepts of the disclosure and is not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The proposed method and apparatus is directed to home appliances and the users thereof. The users may "log in" to the appliance via various methods. Some examples are a simple log in via remote control or smartphone/tablet application, log in via some sort of audio ID (recognition of a person by voice, or a dedicated voice command "TV log in Steve") or login via visual recognition (such as the Kinect camera from Microsoft) or other biometric data such as fingerprint or iris scan.

Once a user is logged in, the appliance will change the settings to match the preferred settings of that user. If user Steve likes high brightness and a volume setting of 30, the appliance would set these automatically.

These settings could be modified by current conditions of the environment. For example, if the ambient lighting in the room is low, the brightness setting would be somewhat reduced, which could be for many reasons: the brightness is too much for the current conditions of the room; or the reduction in brightness could save power. The audio level could be changed to respond to the ambient noise in the room. Taking it a bit further, if the appliance uses a video camera, it could recognize that Steve is wearing a football jersey and automatically change the appliance settings to a "sports" mode.

Another condition that could affect the settings is the time of day. The user could have differing settings that are time of day dependent, or the settings could be modified to take the time of day into account, such as reducing the volume level and brightness after the sun has gone down.

The settings could also adapt to user behavior. If user Bill always turns the brightness back up after it is automatically reduced based on some external condition, the appliance could learn this and stop modifying the brightness (or modify it to a smaller degree) when Bill is in the room.

When more than one person is in the room or "logged in," the appliance would have to decide which settings to use. There are many ways to accomplish this, some examples of which are described here:

A simple linear combination of the preferred settings ((A+B+C)/3) so if Steve likes the volume at 30 and Bill likes the volume at 20 and Cathy likes the volume at 40, the volume would be automatically set to 30 [floor((30+20+40)/3)].

A weighted combination of the preferred settings ((2A+2B+C)/5), depending of the relative status of the people in the room (if Cathy is a child and Bill and Steve are adults, perhaps Cathy has less impact on the settings). Using the numbers from above, the volume would be set to 28 [floor((60+40+40)/5)].

There are certain settings that the user may not want to adjust in a linear fashion or by a predetermined function or weighting. These settings could be represented by a predetermined curve and adjust (change) to the point on the curve that corresponds with the mean or weighted mean of the users in the room. If Bill's value of 20 matches point 5 on the curve and Steve's value of 30 matches point 7 on the curve and Cathy's value of 40 matches point 12 on the curve, the mean point on the curve would be 8 [floor((5+7+12)/3)], which could correspond to a volume setting of 32.

The concept of dominant/recessive could be applied in one of two ways:

Dominance by a person: If Steve is in the room, his settings will override anyone else. If there are only people classified as "recessive" in the room, then the negotiation could be via one of the other methods. If there is more than one person classified as "dominant," then the negotiation could be done via one of the other methods.

Dominance by setting: A particular setting could be designated as "dominant," meaning that the setting would be set by the dominant person in the room, which may make the most sense for simple On/Off type settings.

The users could all have a priority, where the user with the highest priority in the room wins the negotiation.

The settings could be determined by a simple majority wins scenario (makes the most sense for On/Off type settings). For example, if Bill and Cathy like HDR mode on, but Steve does not, the combination of Bill and Cathy wins.

The settings could be determined by the lowest value among the preferred settings of the users in the room. For example, if Bill and Cathy like HDR mode on, but Steve does not, Steve wins as the lowest setting. With the volume example, Bill would win with the lowest setting (20<30<40).

If the appliance uses a camera, the appliance (camera) could even detect the result of a friendly competition regarding whose settings get used. A camera with suitable software could possibly detect the results of rock-paper-scissors or an arm wrestling competition.

Combinations of these modes are also possible (and sometimes necessary). It is possible that all settings negotiations would follow the same scheme, however, it is also possible that each setting uses a different negotiation scheme.

If the settings are modified by a group of people in the room, the appliance could remember the settings from that group the next time that the same group of people are all in the room. If more people than the group are in the room, the negotiations could be done from scratch, or they could be done based on the group as a unit using the previously negotiated settings as their preference. The group would likely need to have a higher weight versus any individuals that the group is negotiating with for purposes of fair negotiation.

If the appliance uses a camera, the number of people in the room could be detected and a feature like 3D could be enabled or disabled based on how many people in the room are seen to be wearing 3D glasses. This could be done via simple majority or possibly on a weighted scale so that people not wearing 3D glasses might have more of an effect on the setting.

It might be possible to detect that some people are in the room but not paying attention to the appliance (reading, sleeping, having a conversation). This could be done with posture and eye tracking or reading the pulse with an IR camera or via another method. If there are people in the room that are not paying attention, there are a few options of what to do with respect to negotiating the appliance settings:

- The people not paying attention could be treated like they are not even present in the room. They are not paying attention so their preferences do not matter.
- The people not paying attention could be treated as "ghost" profiles, which may have lower settings for things like volume so they are able to read/have a conversation/etc.
- The negotiating style for the setting could be changed when there are one or more people present that not paying attention.
- The people not paying attention could be treated normally, in case they are half-paying attention.

If someone is detected as sleeping, there may be special settings that automatically get applied or negotiated. For example, there could be an upper limit placed on volume (and/or the volume could be automatically lowered), brightness could be automatically lowered, color temperature could be shifted to red instead of blue (high color temperature has be shown to inhibit production of melatonin, affecting the ability to fall asleep and the quality of sleep).

Another possibility for settings negotiation is parental controls. The login process could determine that one of the people in the room is a child and automatically apply the parental controls settings. If there are only adults in the room, the parental controls could be automatically disabled or reduced. If there are adults and children in the room, the parental controls could detect who is making changes to the current channel, for example, and allow any settings changes if one of the adults is making settings changes (e.g., channel changes), but disallow settings changes (e.g., channel changes) if one of the children is attempting to make settings changes (e.g., channel changes). This also opens up the possibility to have relationships defined among the profiles. If Steve has a "parental" relationship to Cathy, it could allow him to change the channel to a channel/program that would have been blocked by parental controls while Cathy is in the room. If Bill does not have a "parental" relationship with Cathy, then parental controls would prevent him from changing the channel to objectionable content while Cathy is in the room.

A brief (non-exhaustive) list of some settings that could be negotiated in these manners:

Program selection
Volume level
Channel
3D on/off
3D depth
Closed caption settings
Font
  Color
  Size
  On/off
Brightness
Contrast
Picture mode
Sound mode
Multiple sound outputs
Parental controls
HDR on/off There are, of course, many, many more settings that could be negotiated.

Another useful way of applying settings could be through a form of contextual awareness. Using a combination of sensors, microphone(s), and camera(s), settings could be determined or negotiated based on an understanding of what is occurring in the vicinity of the home appliance. Different types of cameras could be used, including video, infrared, and others. Cameras can be used in a variety of ways, including thermal imaging, depth sensing, motion sensing, and video recording. Cameras may also include thermal imaging cameras, still cameras, plenoptic cameras and/or time-of-flight cameras. Many different sensors are available on the market today, including motion sensing, temperature sensing, moisture sensing, power meters, and open/close sensing (e.g. sensing the opening of doors or windows) as a few examples.

Using a combination of the inputs available through these and other devices and some hardware or software, contextual awareness can be achieved and applied to settings on many different home appliances, including but not limited to consumer electronics devices and home control devices like a thermostat or security system. Some examples of things that could be observed might be the age or gender of someone in the room, the current activities of people in the room, or the current ambiance of the room.

Using a microphone and camera, the age and gender of a person could be determined, with more accuracy over time and applied to settings of a device. This information could be used on-the-fly or stored in a profile and updated over time to achieve greater accuracy in the information determination. The age, in particular, could be used in different ways, including parental controls. If the age of the person is determined to be below a threshold, parental controls could be automatically enabled or modified. Gender determination could affect recommendations offered by a video service.

Gender and age recognition could use body shape, facial hair and makeup as cues. Voice may provide one of the most accurate cues, as both the pitch, modulation and sibilance of voices vary predictably with gender and age. The camera would correlate a voice with a person by monitoring lip movement. That is, the device which settings are being adjusted may receive input from a second device. The second device (camera, sensor, etc.) detects physical characteristics of people present in the area. The physical characteristics are used by the device being adjusted to determine who is present in the area. Once it is determined who is present in the area, then that information is used to identify and locate the profile information for those present in the area. This information could also be determined on-the-fly or stored in a profile and updated to improve accuracy. The presence of multiple people in a room could allow for the determination of a relationship between the people. The determination of a relationship could apply to parent-child, spouses, friendships, and possibly other relationships. These determined relationships could be used for things like parental controls (parents can override parental controls for their children, while others cannot override parental controls, for example) or negotiate settings. That is, profile information includes physical characteristics, age, gender, favorite teams or relationships between people or profiles. Profile information (data) is stored and updated over time. The profile data (information) updating may be performed by the person whose profile it is or may be performed automatically by observation by secondary devices. For example, a child (boy) growing up may develop facial hair or a person may begin or suddenly lose hair. Hair loss may be a result of aging or result suddenly as a result of chemotherapy. The device being adjusted may receive input from a second device (e.g., camera or other sensor). The second device may detect, for example, that a child is present in the area. If the device being adjusted is used for receiving and rendering content then parental controls are automatically invoked. Parental controls may or are able to be overridden by a parent or guardian or other adult with a predetermined relationship with the child.

Profiles could be created for people that are recognized but do not have an account on the system. These "ghost" profiles could be updated as the person is recognized over multiple occasions, just like a normal profile. An example of this would be a friend that frequently visits the house, but has never had a need to have an account on the system. This person could eventually create an account on the system, and the system could populate the new profile with the information from the "ghost" profile associated with them. Things like, height, gender, and relationships could have been determined in the past for the ghost profile and the new profile would contain all of that information. If a new profile has not been created, the system could use the "ghost" profile for the person for things like negotiation of settings, or distance based changes, for example.

A combination of motion sensors, video, thermal, and infrared cameras, and audio from a microphone could give many clues as to the current activity of the people in the room. The infrared camera could be used to detect heartbeats, the thermal camera could be used to detect body temperature, and the microphone, video camera, and motion sensor data could be used in concert to determine that a person is exercising, or dancing, or singing and make changes to the home appliances in accordance with the activity. If a person is detected as singing or dancing, the volume of the home appliance that is providing sound could be turned up or down or the equalizer for the device could be modified to reduce the vocal frequency range to simulate karaoke. If the person is determined to be exercising, the data from the sensors could be applied to a device or application to track heartbeat and body temperature or the progression of an exercise program. Detection of a high or low body temperature relative to normal could also be used to modify a thermostat, or possibly even notify the person that they may be running a fever or the like.

The cameras could be used to detect clues from wearables, including clothing being worn, or possibly sensors from electronic devices worn on the body. These clues could be used to determine that the person is wearing a sports jersey, and could apply settings related to a sports-watching mode. Wearables does not only include sports jerseys. Apparel (wearables) bearing sports team logos, wherein apparel includes, hats, caps, jerseys, shirts, sweatshirts, jackets, shorts, pants, athletic pants, sweatpants, shoe and the like, and wherein sports team logos may be professional sports team logos, collegiate sports team logos or international (e.g., Olympic) sports team logos, and further wherein sports team logos may include football, baseball, basketball, soccer, hockey, skiing, snowboarding, swimming, diving, volleyball, etc. The clues could determine that a person is wearing 3D glasses and automatically switch into 3D viewing mode. The clues could also determine that a person is wearing a smartwatch/activity band or holding a smartphone or tablet and trigger uploads of data to an application or downloads of information regarding the current program being watched.

An infrared camera could be used to determine the distance of a person from its location. This could be used to increase or decrease the size of closed captions on a television depending upon the distance the person is from the device or adjust the heating or cooling settings of a third device. Depth information could also be used to increase or decrease volume of a home appliance depending upon the position of a person in the room. This information could also be used to change the operation of a thermostat in order to more effectively direct heating/cooling depending upon where a person is in a room.

Different cameras could be used to detect the lighting in the room and clues from the current lighting could be used to modify things like brightness/contrast, or a video mode of a home appliance. Lighting clues could also be used based on a set preference by the user to operate electronic blinds to let in/shut out light from outside based on the current lighting in the room. Conversely, the lighting in the room could be brightened or dimmed depending on the light coming in from outside to maintain a consistent level of light for the room.

SOME EXAMPLE SCENARIOS

Some examples of possible scenarios using the method and apparatus of the proposed method and apparatus:

1) In the situation where "One spouse wants to sleep, the other wants to watch TV", the TV could use person recognition techniques to determine that one person is trying to sleep. A camera or light sensor could determine that bedroom lights are out. The time of day could be considered as well. When this conflict is detected, the TV activates contrast reduction and volume limiting. Once the condition is detected, the mode remains activated until the TV is turned off.

2) In the situation where there is a "Sports party where some want to hold a conversation and others want to focus on the game", the TV can recognize that the program is a sporting event, that there is a crowd in the room, and that the conversation level is high. When this conflict is detected, the TV activates closed captioning. Once the condition is detected, the mode remains activated until the event ends. In addition, the picture may be shrunk to allow captions to be placed below the picture, so there's no chance of obscuring the ball.

3) In the situation where the people present in the room have "Differing commercial preferences", the TV is able to recognize the individuals in the room through facial recognition, or try to ascertain their ages and genders. Targeted advertising can then favor advertisements that would appeal to everyone and disfavor ads that might be inappropriate for some occupants of the room.

4) In the situation where "One person is hot, the other is cold", the thermostat needs to be adjusted for the current heating/cooling zone. But if there are two people in the zone that have different preferred temperatures, the temperature setting could be adjusted based on a predefined curve between the two preferred temperatures in order to make both people somewhat comfortable.

5) In the case of program selection, the appliance (e.g., TV) could be configured to automatically select a program based on those present in the room.

6) In the case of multiple sound outputs, if the users of an appliance (e.g., TV) each have headphones plugged in to the appliance, then the settings could be different for each set of headphones depending on who is using which headphones and according to the preferences of each headphone user.

It is advantageous to notify the viewer when a negotiated setting has been activated. This prevents the viewer from thinking his television is misbehaving, and alerts him to the existence of the feature. Notification can be in the form of temporarily displayed text or an icon. The text or icon could be displayed temporarily or the text or icon could be displayed for the duration of the mode.

It is also possible to have settings travel with a user. If Steve went to Bill's house to watch the football game, it is possible that Bill's TV could understand Steve's settings, possibly through manual means like bringing them on a USB key or through creating an account for Steve and importing his settings from his smartphone or from a server, or even possibly through some sort of recognition of Steve, possibly in conjunction with a social media account (Steve and Bill are Facebook friends, so Steve's settings come from his Facebook account to Bill's Facebook account to Bill's TV). Steve's setting may only have to be imported (downloaded) once.

Of course, with different viewing environments, it is possible that Steve would not want to use his standard settings for certain items like brightness, or it is possible that Steve could tweak his normal settings to what he likes in Bill's environment and they would be saved that way for whenever Steve is at Bill's house. The settings could be stored locally on the appliance, or somewhere in the cloud, or on Steve's smartphone, or even on a Facebook or some other social media account.

When the TV has access to both Steve's settings preferences and Bill's settings preferences it could present a menu asking whether to use Steve's settings, Bill's settings, or a blended setting. The blended setting could be manually configured by Bill and Steve or could be automatically configured by combining each users settings. For example, if Bill sets brightness to 50 and Steve sets brightness to 70, the automatic blended setting could set brightness to 60. In cases where it is not possible to create a blended setting, the automatically configured blend would default to the 'home' user—in this case Bill, since Steve went to Bill's house. If Bill and Steve decided to manually configure their blended setting, there could be a user interface showing each configurable setting and allowing Bill and Steve to quickly select 'Bill's Setting', 'Steve's Setting' or manually configure.

FIG. 1 is a flowchart of an exemplary automatic settings negotiation scheme of a device in accordance with the principles of the proposed method and apparatus. The automatic settings negotiation is specific to a particular device. For example, the automatic settings for a thermostat would not be the same as the automatic settings for a TV. At 105 a determination is made if a user has logged in to the device. The user may log in by means of a keypad attached to or associated with the device itself, a remote control device, a smartphone, a computer, a laptop, a tablet, an iPad, an iPod, an iPhone, an audio Id, a video ID, biometric data including a fingerprint or an iris scan. That is, the device configured to perform automatic settings negotiation may be equipped to accept (receive) audio input and perform voice recognition or video input using a camera. The device may be equipped to accept (receive) biometric data or wired line or wireless logins from a remote control, a smartphone, tablet, laptop, computer, iPod, iPad, iPhone or the like. At 110 a determination is made if the device has been configured to automatically negotiate and adjust settings. Once again the settings that are or have been configured to be negotiated and adjusted vary by device. At 115 a determination is made regarding what settings have been configured to be negotiated and adjusted automatically. Just because certain settings may be negotiated and adjusted automatically does not mean that all of the settings that are possible to be negotiated and adjusted automatically have been configured to be negotiated and adjusted automatically. For example, just because it is possible to adjust picture (screen size or aspect ratio) does not mean that, that particular setting has been configured to be negotiated and adjusted automatically. At 120 a determination is made as to who is present in the room. This determination will impact which settings to use and whether automatic settings negotiation and adjustment is necessary. A determination is also made at this point as to the activities of those present in the room. For example, watching TV, listening to TV or the stereo system, reading, sleeping, etc. In some cases the activity of those present in the room affects or may affect the automatic settings negotiation of several devices. For example, if some of those present in the room are sleeping, that would affect both the temperature setting of the thermostat and the volume of the TV or stereo. At 125 a determination is made as to what settings negotiation method to use. For example, it is possible to use a linear combination, a weighted combination a predetermined curve, a dominant/recessive approach (method, scheme), a priority scheme, a majority scheme, a lowest value scheme or a competition or a combination of any of the above schemes. Once a determination is made as to what settings negotiation method is to be used, then a negotiation method is executed (performed) to determine the setting adjustment. Finally at 130, the device setting adjustment is made by the device.

Figure 2:
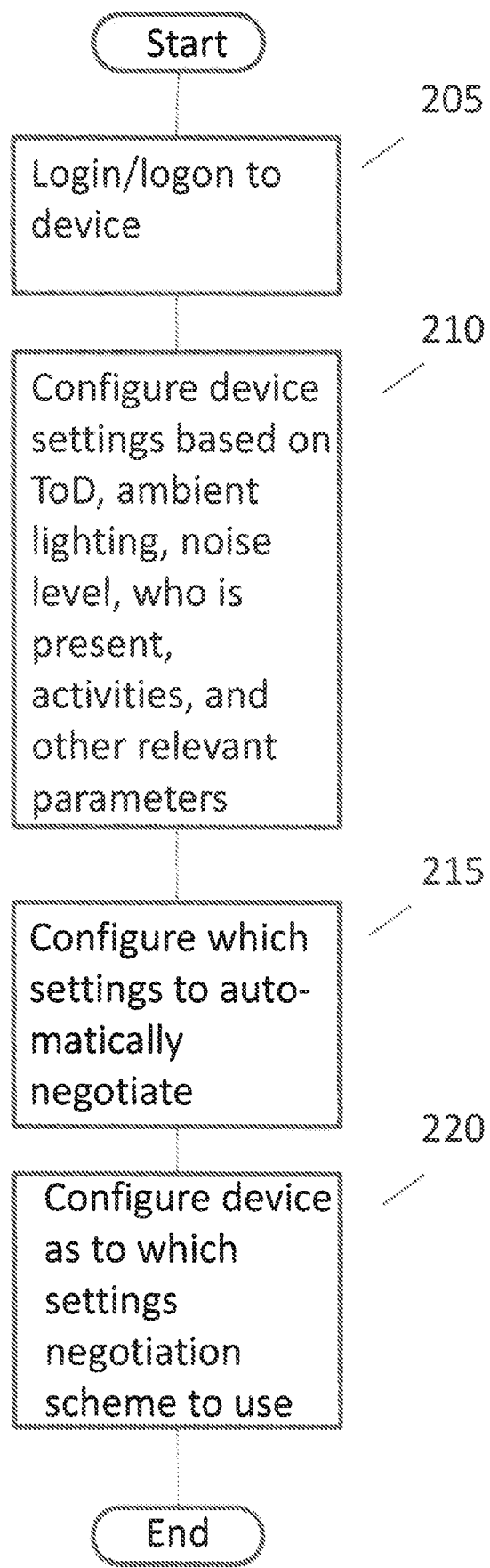
FIG. 2 is a flowchart of an exemplary device configuration scheme in accordance with the principles of the proposed method and apparatus.

FIG. 2 is a flowchart of an exemplary device configuration scheme in accordance with the principles of the proposed method and apparatus. At 205 a user (owner of the device) logs in (logs on) to the device. The device configuration is specific to a particular device. For example, the device configuration for a thermostat would not be the same as the device configuration for a TV. The user may log in by means of a keypad on the device itself, a remote control device, a smartphone, a computer, a laptop, a tablet, an iPad, an iPod, an iPhone, an audio Id, a video ID, biometric data including a fingerprint or an iris scan. That is, the device may be equipped to accept (receive) user log in by audio input and perform voice recognition or video input using a camera. The device may be equipped to accept (receive) biometric data or wired line or wireless logins from a remote control, a smartphone, tablet, laptop, computer, iPod, iPad, iPhone or the like. At 210 the device settings are configured based on time of day (ToD), ambient lighting, noise level, who is present in the room, activities of those present in the room, and other relevant parameters. Each particular device may use different parameters or different subsets of parameters. Configuration may be any of the means described above and may also be accomplished using a USB (flash, thumb) drive or a memory card. This is especially useful for a guest user. The user or guest user may be prompted as to whether the guest user's settings are to be saved. If the guest user is a frequent visitor then this would be helpful. At 215 the device is configured as to which settings are to be automatically negotiated and adjusted. Just because certain settings are able to be negotiated and adjusted automatically does not mean that all of the settings that are possible to be negotiated and adjusted automatically will be configured to be negotiated and adjusted (changed) automatically. For example, just because it is possible to adjust picture (screen size or aspect ratio) does not mean that, that particular setting will be configured to be negotiated and adjusted automatically. At 220 the user configures the device as to which settings use which negotiation scheme. For example, it is possible to use a linear combination, a weighted combination a predetermined curve, a dominant/recessive approach (method, scheme), a priority scheme, a majority scheme, a lowest value scheme or a competition or a combination of any of the above schemes.

Figure 3:
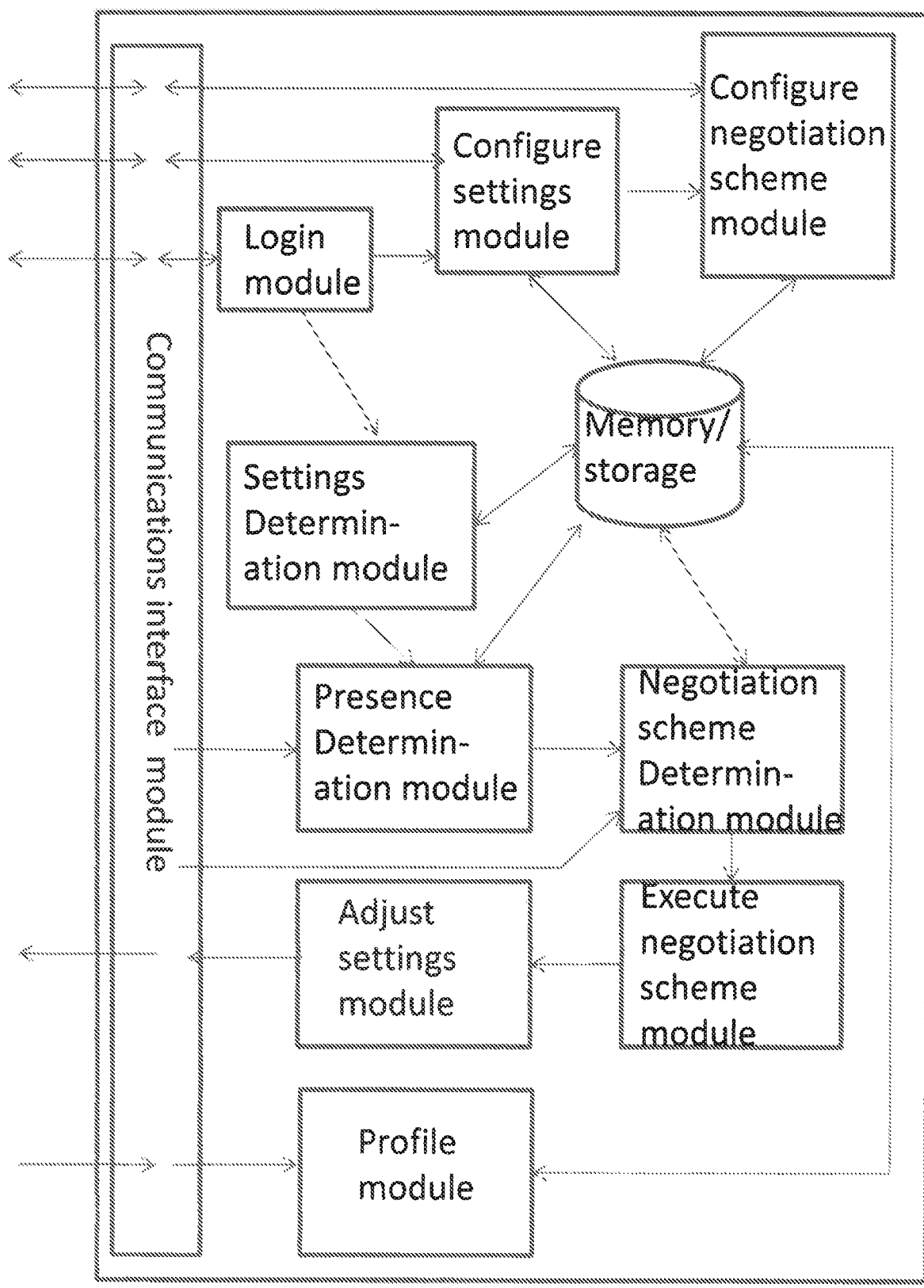
FIG. 3 is a schematic diagram of the operation of an exemplary device in accordance with the principles of the proposed method and apparatus.

FIG. 3 is a schematic diagram of the operation of an exemplary device in accordance with the principles of the proposed method and apparatus. A user (an owner of the device) logs in to the device in order to configure (or reconfigure) the device to automatically adjust (change) some or all if its settings. The user logins in through a communications interface module which is in bi-directional communication with a login module. The device configuration is specific to a particular device. For example, the device configuration for a thermostat would not be the same as the device configuration for a TV. The user may login by means of a keypad attached to or associated with the device itself, a remote control device, a smartphone, a computer, a laptop, a tablet, an iPad, an iPod, an iPhone, an audio ID, a video ID, biometric data including a fingerprint or an iris scan. That is, the device may be equipped to accept (receive) user login by audio input and perform voice recognition or video input using a camera. The device may be equipped to accept (receive) biometric data or wired line or wireless logins from a remote control, a smartphone, tablet, laptop, computer, iPod, iPad, iPhone or the like. Once the user is logged in to the device, the user can provide input to the device regarding which settings the user wishes to be automatically adjusted (changed). The user's input is provided interactively to a configure settings module through the communications interface module. The communications interface module is in bi-directional communications with the configure settings module. This may be voice commands or by a menu or other prompts by the device. The user's input may be provided using a keypad attached or associated with the device itself, a remote control device, a smartphone, a computer, a laptop, a tablet, an iPad, an iPod, an iPhone or keypad attached to or associated with the device itself. Once the user has configured which settings are to be automatically adjusted (changed) the user configures the negotiation scheme to be used to automatically adjust (change) the settings. It should be noted that all communications with the user may take place by any of the means described above. The user communicates with a configure negotiation scheme module through the communications interface module. The communications interface module is in bi-directional communication with the configure negotiation scheme module. It should also be noted that the negotiation scheme configuration may take place after the settings configuration or may take place with the settings configuration. That is, the user may specify a setting that is to be automatically adjusted (changed) and then specify the negotiation scheme to be used to make the automatic adjustment (change) and then specify another setting that is to be automatically adjusted. Both the configured settings and the negotiation scheme are stored in memory (storage). The configuration process may also specify other users whose preferences are to be considered. This can be accomplished by the device owner (user) or by the other individual whose preferences are to be considered. If the device has already been configured for settings that are to be automatically adjusted (changed) and the user logs in again, the user may update any of their previously configured settings or negotiation schemes. Configuration may be any of the means described above and may also be accomplished using a USB (flash, thumb) drive or a memory card. This is especially useful for a guest user. The user or guest user may be prompted as to whether the guest user's settings are to be saved. If the guest user is a frequent visitor then this would be helpful.

If the device has already been configured for settings that are to be automatically adjusted (changed) and the user logs in again, the user may want the device to automatically adjust the settings. The user may be the device owner or any other individual that has their preferences for automatic settings adjustments configured. It should be noted that each user who has their preferences may have configured a different subset of settings to be automatically adjusted (changed). Certain settings may not matter to one or more users or in some cases, such a parental controls, a child user may not be permitted to change or override such settings. The settings determination module determines which (if any) settings are configured to be automatically adjusted (changed). The settings determination module accomplishes this by accessing the memory (storage) that holds the data from the configuration process described above. The settings determination module then passes this information (data) to the presence determination module, which determines who is present in the room. If only the logged in user is present there is no need for settings adjustment negotiation. If there are multiple individuals present in the room then the device attempts to determine who is present and if any of the individuals present in the room have preferences configured. This is accomplished by accessing the memory (storage) where settings configuration and negotiation scheme information was stored (saved). The presence determination module passes this information (data) to the negotiation scheme determination module, which determines which negotiation scheme to use to resolve difference between setting preferences for the various users present in the room. The negotiation scheme determination module accomplishes this by accessing the memory (storage) where the configuration information (data) was stored (saved). The negotiation scheme determination module passes this information (data) along to the execute negotiation scheme module which actually determines the settings adjustments. The settings adjustments are forwarded to the adjust settings module which actually makes the settings adjustments (changes) or forwards the changes to a third device through the communications interface module with which it is in communication. The communications interface module may accept (receive) input from a second device or users. The communications module forwards any input it receives to the login module or the configure settings module or the configure negotiation scheme module or the profile module or the presence determination module. The presence determination module also receives input from a second device though the communications interface module. A second device may include sensors or cameras etc. The presence determination module also determines if any activity is occurring and what the activity is. The presence determination module also determines a distance between people present in the area based on input from a second device received through the communications interface module and also determines the distance of people from the device. The communications interface module would interface with the negotiation scheme determination module as does the presence determination module. The negotiation scheme determination module adjusts the device settings responsive to the input from the second device and in accordance with the setting preferences specified by the user and previously stored (saved) in memory (storage). The communications interface module may also send input to a third device. The communications interface module receives changes for the third device from the adjust settings module, with which the adjust settings module is in communication. This input may be used to change the settings of the third device. The third device may include sensors, cameras, Internet of Things (IoT) devices, lighting, thermostats or any other controllable home appliance, etc. The profile module is in bi-directional communication with memory. The profile module creates and updates profiles—both normal profiles and ghost profiles. Normal profiles are created for users that have logged in. The profile module receives input through the communications interface module with which it is in communication. The profile module also creates normal profiles from ghost profiles. The profile module also determines relationships between profiles. The profiles being stored in memory.

The modules depicted in FIG. 3 are exemplary and may be in software executed on one or more processors, any of which maybe application specific integrated circuits (ASICs), reduced instruction set computers (RISCs), field programmable gate arrays (FPGAs) or the like or equivalent. The exemplary modules depicted on FIG. 3 may be increased or decreased in number with no ill effect upon the design.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

The invention claimed is:

1. A method comprising:
receiving input from a sensor, detecting physical characteristics of at least two people present in an area;
determining presence in the area based on the physical characteristics of the at least two people in the area;
retrieving profile information of the at least two people present in the area, the profile information including at least one of physical characteristics, age, gender, favorite teams and relationships between the at least two people;
determining a relationship between the at least two people in the area, the at least two people being represented by their respective profiles;
determining that at least one preference setting is to be applied responsive to the determined relationship between the at least two people present in the area; and
adjusting settings of a first device responsive to determining that the at least one preference setting is to be applied.

2. The method according to claim 1, further comprising determining an activity type being engaged in by the at least two people present in the area.

3. The method according to claim 2, wherein the activity includes one of singing, dancing and exercising.

4. The method according to claim 2, further comprising:
determining a distance between the at least two people present in the area; and
adjusting settings of the first device responsive to the distance between the at least two people in the area.

5. The method according to claim 4, wherein the distance between the at least two people is an average distance between three or more people in the area.

6. The method according to claim 4, wherein adjusting settings includes modifying closed captioning on the first device or adjusting volume of the first device or adjusting heating or cooling settings.

7. The method according to claim 1, further comprising:
determining a distance of the at least two people from the first device or a second device; and
adjusting settings of the first device responsive to the distance of at least two people from the first device or the second device in the area.

8. The method according to claim 7, wherein adjusting settings includes modifying closed captioning on the first device or adjusting volume of the first device or adjusting heating or cooling settings.

9. The method according to claim 7, wherein the second device detects lighting conditions in the area and adjusts settings responsive to the lighting conditions.

10. The method according to claim 1, further comprising creating a ghost profile for at least one of the at least two people present in the area for whom a match of physical characteristics of the at least one of the at least two people in the area is not among a set of profiles for the first device or who is not paying attention to the first device.

11. The method according to claim 10, further comprising updating the ghost profile upon recognition.

12. The method according to claim 10, further comprising creating a profile from a ghost profile including physical characteristics received as input.

13. An apparatus comprising:
a communications interface, the communications interface receiving input from a sensor, the sensor detecting physical characteristics of at least two people present in an area;
a processor configured to:
determine presence in the area based on the physical characteristics of the at least two people in the area;
retrieve profile information of the at least two people present in the area, the processor in communication with the communications interface, the profile information including at least one of physical characteristics, age, gender, favorite teams and relationships between the at least two people;
determine a relationship between the at least two people in the area and storing the determined relationship in a storage module, the at least two people being represented by their respective profiles;
determine that at least one preference setting is to be applied responsive to the determined relationship between the at least two people present in the area; and
adjust settings of a first device responsive to determining that the at least one preference setting is to be applied.

14. The apparatus according to claim 13, wherein the processor is further configured to determine an activity type being engaged in by the at least two people present in the area.

15. The apparatus according to claim 14, wherein the activity includes one of singing, dancing and exercising.

16. The apparatus according to claim 13, wherein the processor is in communication with the communications interface module and is further configured to:
determine a distance between the at least two people present in the area;
adjust settings of the first device responsive to the distance between the at least two people in the area.

17. The apparatus according to claim 16, wherein the distance between the at least two people is an average distance between three or more people in the area.

18. The apparatus according to claim 13, wherein the processor is further configured to adjust settings by modifying closed captioning on the first device or adjusting volume of the first device or adjusting heating or cooling settings.

19. The apparatus according to claim 13, wherein the processor is further configured to:
determine a distance between the at least two people from the first device or a second device; and
adjust settings of the first device responsive to the distance between at least two people from the first device or the second device in the area, the processor being in communication with the communications interface module.

20. The apparatus according to claim 19, wherein the processor is further configured to adjust settings by modifying closed captioning on the first device or adjusting volume of the first device or adjusting heating or cooling settings.

21. The apparatus according to claim 19, wherein the second device is configured to detect lighting conditions in the area and adjust settings responsive to the lighting conditions.

22. The apparatus according to claim 13, wherein the processor is further configured to create a ghost profile for at least one of the at least two people present in the area for whom a match of physical characteristics of the at least one of the at least two people in the area is not among a set of profiles for the first device or who is not paying attention to the first device.

23. The apparatus according to claim 22, wherein the processor is further configured to update the ghost profile upon recognition.

24. The apparatus according to claim 22, wherein the processor is further configured to create a profile from a ghost profile including physical characteristics received as input.

25. The apparatus according to claim 13, wherein the apparatus is a consumer electronic device.

26. The apparatus according to claim 25, wherein the consumer electronic device is a home appliance.

27. The apparatus according to claim 26, wherein the home appliance is one of a television, a set top box and an audio-video receiver.

* * * * *